Jan. 31, 1961   R. S. MARSDEN, JR   2,970,259
FLAME DETECTOR
Filed April 23, 1951

INVENTOR.
R. S. MARSDEN, JR.
BY Hudson & Young
ATTORNEYS

United States Patent Office 2,970,259
Patented Jan. 31, 1961

2,970,259
FLAME DETECTOR

Ross S. Marsden, Jr., Bartlesville, Okla., assignor to Phillips Petroleum Company, a corporation of Delaware Filed Apr. 23, 1951, Ser. No. 222,325

1 Claim. (Cl. 324—71)

This invention relates to a method of and apparatus for detecting the presence of flame. In another aspect it relates to a method of measuring ionization.

It is known that in any given electrical resistance element having two electrodes connected thereto, one of which is grounded, there exists a constant distribution of potential at all points throughout said element. If a charged particle is brought into contact with the surface of this element, an electrical current will flow in said element until all points therein are once again at zero or ground potential. During that time when current is flowing, the region of the element in the neighborhood of the ungrounded electrode will exhibit a potential variation which is dependent upon the magnitude of the charge on the particle striking said element, the resistance of the element and the geometric relation of the ungrounded electrode with respect to the second grounded electrode. By measuring this potential variation through the use of a suitable amplifying circuit, there is obtained an indication of the presence of electrically charged particles striking the element. Since it is known that ionized gases occur in the region of a flame, this method of measuring potential variation provides effective means for detecting the presence of flame; appropriate electrical circuitry for use in this manner is described and claimed in the copending application of D. R. de Boisblanc, Serial No. 220,113, filed April 9, 1951, and now Patent No. 2,847,643.

The electrical noise signals produced by the presence of a flame, however, are of small magnitude and must be amplified many times before being of sufficient magnitude to readily actuate known indicating devices. As a means for providing a more sensitive indication, it has been discovered in accordance with the present invention that if an independent voltage source is inserted in circuit with the flame detecting element, the electrical noise signal produced by flame impinging upon said element will be of magnitude many times that produced in the absence of said voltage source. The use of a voltage source in this manner, therefore, greatly extends the useful range of the abovementioned flame detector to include small flames or those which produce relatively weak ionization.

Accordingly, it is an object of this invention to provide an improved form of flame detector.

A further object is to provide means for detecting and measuring ionization.

A still further object is to provide flame detecting apparatus which is positive in action, reliable in result, of durable construction, and which employs a simplified electrical circuit.

Various other objects, advantages, and features of this invention will become apparent from the following detailed description taken in conjunction with the accompanying drawings in which.

Figure 1:
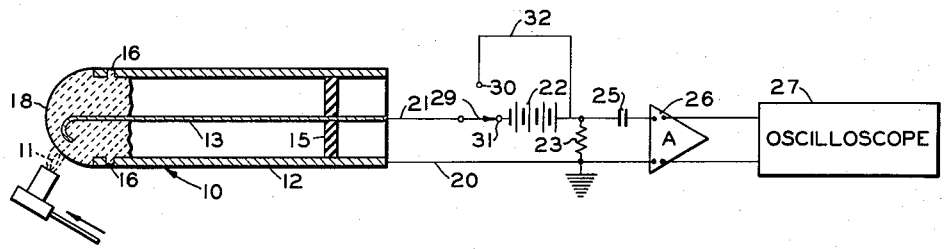
Figure 1 illustrates schematically a flame indicating element and electrical circuitry utilized in connection therewith.

Referring now to the drawings in detail and to Figure 1 in particular, there is shown a flame indicating element 10 positioned in the region of a flame 11 whose presence is to be detected. Element 10, which is of a form more fully described and claimed in my copending application, Serial No. 220,116, filed April 9, 1951, now Patent No. 2,708,815, comprises a metallic casing 12 having a metallic electrode 13 positioned therein and electrically insulated from casing 12 by means of suitable insulating supports such as 15. A ceramic refractory tip 18, into which while plastic is inserted the hook-shaped end of electrode 13 is positioned across one end of casing 12 and anchored thereto by being inserted into holes 16 formed near the end of casing 12. Tip 18 preferably is constructed of a baked and hardened refractory material such as aluminum oxide, since such a material is capable of withstanding the effects of high temperature flames. Electrical leads 20 and 21, attached to casing 12 and to electrode 13, respectively, connect voltage source 22 and resistor 23 in series relationship with flame indicating element 10. While ceramic tip 18 normally is considered to be electrically non-conducting, at the elevated temperatures produced by flame 11 impinging thereon, the electrical resistance in tip 18 is lowered considerably thereby enabling a current to pass therethrough. An alternating current amplifier 26 is applied across resistor 23 and coupled thereto by means of capacitor 25. The output of amplifier 26 is applied to an oscilloscope 27.

If it is assumed that a flame 11 is impinging upon tip 18, ions created within flame 11 will bombard the surface of tip 18 and so generate electrical noise voltage fluctuations across said tip; each ion that strikes tip 18 introduces a small burst of current therein. The voltage fluctuations generated between casing 12 and electrode 13 by the individual bursts of current have a statistical fluctuation of magnitude over a wide frequency range, but must be amplified by amplifier 26 before being of sufficient magnitude to give a readable signal on oscilloscope 27. While there is provided a direct current circuit path from battery 22 through resistor 23, one terminal of which is grounded, lead 20, casing 12, tip 18, electrode 13, and lead 21 back to battery 22; the measured signal on oscilloscope 27 consists entirely of alternating current electrical noise voltage fluctuations superimposed upon the direct current flow. The direct current flow is blocked from amplifier 26 by means of capacitor 25. Even though the direct current flow is not measured on oscilloscope 27 directly, the presence of battery 22 greatly increases the magnitude of the noise signal created by flame 11 impinging upon tip 18, and it is this noise signal which is detected on oscilloscope 27. Voltage source 22 preferably is inserted in the above-mentioned circuit so that the negative terminal of said voltage source is applied to the non-grounded electrode 13, casing 12 being grounded. Although improved results are obtained regardless of the polarity connections of voltage source 22, readings of greater magnitude are obtained with the polarity as described.

Figure 4:
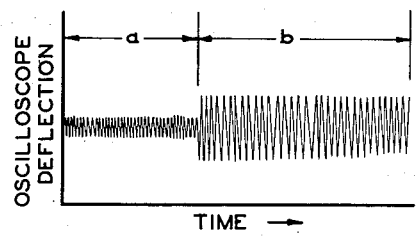
Figure 4 is a graphical representation of the effect of the voltage source inserted in Figures 1, 2, and 3.

In Figure 4 there is illustrated a graphical representation of the effect of voltage source 22 being inserted in the circuit of Figure 1. If switch 29 is positioned on terminal 30, lead 21 is connected directly to lead 32 eliminating voltage source 22 from the detecting circuit. At this position the magnitude of the oscilloscope deflection will be as shown in Figure 4 for the time interval $a$, When switch 29 is restored to terminal 31, thereby inserting voltage source 22 in circuit once again, the relative magnitude of the oscilloscope deflection with respect to the previous reading will be as indicated by the time interval $b$. It can be seen that the effect of voltage source 22 in the circuit is such as to greatly increase the measured voltage noise signal. Signals of increased magnitude have been obtained through the use of voltage sources ranging from 3 to approximately 67 volts. However, these values should be considered by way of illustration rather than limitation. The upper limit of voltage which can be applied appears to be limited only by the breakdown strength of the flame indicating element; generally, the larger the voltage applied the larger the indicated signal. In like manner, satisfactory results have been obtained, through the use of resistors 23 having magnitudes of from approximately 10,000 to approximately 500,000 ohms, with signals of greater magnitude being obtained at the higher values. Again, these resistance values should be considered as illustrative and not by way of limitation. Amplifier 26 can be any known alternating current amplifier, but should be capable of transmitting signals over a wide frequency band, for example 10 cycles to 100 kilocycles, in order that maximum voltage fluctuations be transmitted through said amplifier.

Figure 2:
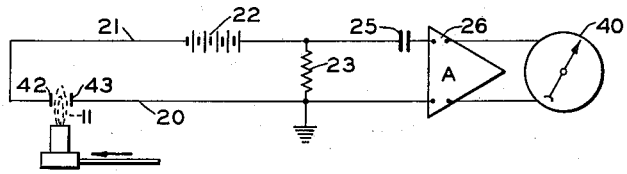
Figure 2 illustrates a second form of flame indicating element employed in conjunction with the electrical circuitry of Figure 1.

In Figure 2 there is shown a simplified form of the apparatus of Figure 1 wherein like circuit elements are designated by like reference numerals. The electrical circuit is similar to that shown in Figure 1 with the exception that a suitable meter, such as thermocouple meter 40, replaces oscilloscope 27. The flame sensing element in Figure 2 is shown as comprising an air gap formed by opposing spaced electrodes 42 and 43. The air gap formed between these electrodes is effective as a flame indicating element as is the ceramic tip 18 of Figure 1, it having been discovered that a flame, such as 11, directed between electrodes 42 and 43 produces an electrical noise signal.

Figure 3:
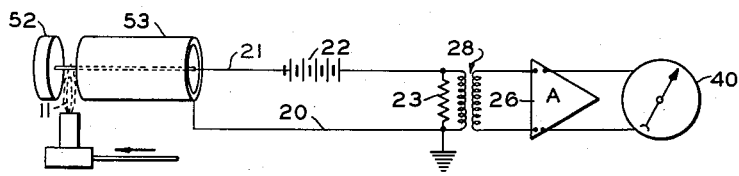
Figure 3 illustrates a third form of flame indicating element employed in conjunction with the electrical circuitry similar to that of Figure 1.

A third form of flame sensing apparatus is illustrated in Figure 3 wherein a solid metallic disk 52 having electrical lead 21 connected thereto is positioned adjacent hollow metallic cylinder 53 having lead 20 connected thereto. Flame 11 is directed within the air gap formed between disk 52 and cylinder 53, lead 21 being inserted through but spaced from cylinder 53. In addition, amplifier 26 is shown as being inductively coupled to the noise element circuit by means of transformer 28 in place of capacitor 25 of Figures 1 and 2.

It should be pointed out in connection with Figures 2 and 3 that the air gaps formed therein are in no way equivalent to the numerous ionization gages and flame detection apparatus known to the prior art which employ the principle of completing an electric circuit through an air gap by means of a conducting flame. In these various prior art devices an external source of voltage is applied across a normally non-conducting air gap, and any conduction thereacross due to ionization within said air gap by the presence of flame therein is detected by means of the completed electrical circuit. While the present invention employs an external source of voltage 22, the signal being detected is in no way equivalent to the completed electrical circuit of the prior art devices, rather what is being detected is the presence of electrical noise generated by flame impinging upon an electrical noise element, the air gap being this element in Figures 2 and 3. The direct current flowing in these circuits is blocked from the detecting element by means of capacitor 25 or transformer 28 so that the measured signal is entirely the alternating current electrical noise fluctuations.

It should be apparent that there has been provided in accordance with this invention an improved form of flame detector. Excellent results have been obtained through the use of this detector as an indicating device for various hydrocarbon flames, although the invention is by no means limited to any particular type of flame. Since the detecting elements indicate the presence of ionization, various chemical reactions which produce ions also can be detected, and in a similar manner the degree of ionization within a given region can be detected. While the above description has been taken in conjunction with a preferred embodiment of this invention, for purposes of illustration, the invention should not be considered as limited thereto.

Having described my invention, I claim:

A flame detector comprising, in combination, an electrically conductive casing, an electrode positioned within and electrically insulated from said casing, a ceramic refractory tip connected across one end of said casing and making electrical contact with said casing and with said electrode, a voltage source and an impedance element connected in series relationship between said casing and said electrode, an amplifier, current indicating means connected to the output terminals of said amplifier, and means connecting the input terminals of said amplifier to respective end terminals of said impedance element.

References Cited in the file of this patent

UNITED STATES PATENTS

| | | |
|---|---|---|
| 824,638 | De Forest | June 26, 1906 |
| 867,877 | De Forest | Oct. 8, 1907 |
| 2,033,465 | Graham | Mar. 10, 1936 |
| 2,272,239 | Delmhorst | Feb. 10, 1942 |
| 2,316,872 | Kernen | Apr. 20, 1943 |
| 2,317,720 | Barnes et al. | Apr. 27, 1943 |
| 2,343,001 | Cohen | Feb. 29, 1944 |
| 2,374,610 | MacLaren | Apr. 24, 1945 |
| 2,523,017 | Harrison | Sept. 19, 1950 |
| 2,671,200 | Lederer | Mar. 2, 1954 |

OTHER REFERENCES

Physical Review, vol. 74, No. 11, December 1, 1948, pages 1714–1719, article by Cook et al.

The Review of Scientific Instruments, vol. 20, No. 11, November 1949, pages 785–794, article by Garrison et al.